United States Patent [19]

Enoshima et al.

[11] 4,420,967
[45] Dec. 20, 1983

[54] KNOCK DETECTOR

[75] Inventors: Toshio Enoshima, Fujisawa; Shoji Furuhashi; Hideyuki Tamura, both of Yokohama, all of Japan

[73] Assignee: Nissan Motor Company, Limited, Yokohama, Japan

[21] Appl. No.: 234,008

[22] Filed: Feb. 12, 1981

[30] Foreign Application Priority Data

Feb. 18, 1980 [JP] Japan .................................. 55-18426

[51] Int. Cl.³ .............................................. G01L 23/22
[52] U.S. Cl. ......................................................... 73/35
[58] Field of Search ...................... 73/35; 123/425, 435

[56] References Cited

U.S. PATENT DOCUMENTS

| 4,002,155 | 1/1977 | Harned et al. | 73/35 X |
| 4,111,035 | 9/1978 | West et al. | 73/35 |
| 4,233,836 | 11/1980 | Yoneda et al. | 73/35 |
| 4,279,143 | 7/1981 | Guipaud | 73/35 |

FOREIGN PATENT DOCUMENTS

| 2917213 | 11/1979 | Fed. Rep. of Germany . |
| 3016117 | 11/1980 | Fed. Rep. of Germany . |
| 2918420 | 11/1980 | Fed. Rep. of Germany . |
| 3038352 | 4/1981 | Fed. Rep. of Germany . |

Primary Examiner—James J. Gill
Attorney, Agent, or Firm—Lane, Aitken & Kananen

[57] ABSTRACT

A comparator compares, either before or after being rectified, a signal obtained from the vibration signal representing the vibrations of a spark ignition internal combustion engine and which has passed through a signal transmitting circuit, with a reference level signal from a reference level signal forming circuit to produce a knock signal representing the occurrence of knocking when the former signal is greater in magnitude than the latter. The reference level signal forming circuit rectifies and smooths the vibration signal to produce a rectified smoothed signal, and includes a first amplifying circuit which amplifies the rectified smoothed signal to produce the reference level signal, mentioned above. When the engine speed is above a predetermined value, an engine speed determining circuit produces a drive signal to which a changeover circuit responds by changing the magnitude of at least one of the signal transmitting circuit and the reference level signal forming circuit from one value to another whereby possible knocking occurring in the overall range of higher and lower engine speeds is reliably detected for use in spark timing control in the spark ignition internal combustion engine.

22 Claims, 15 Drawing Figures

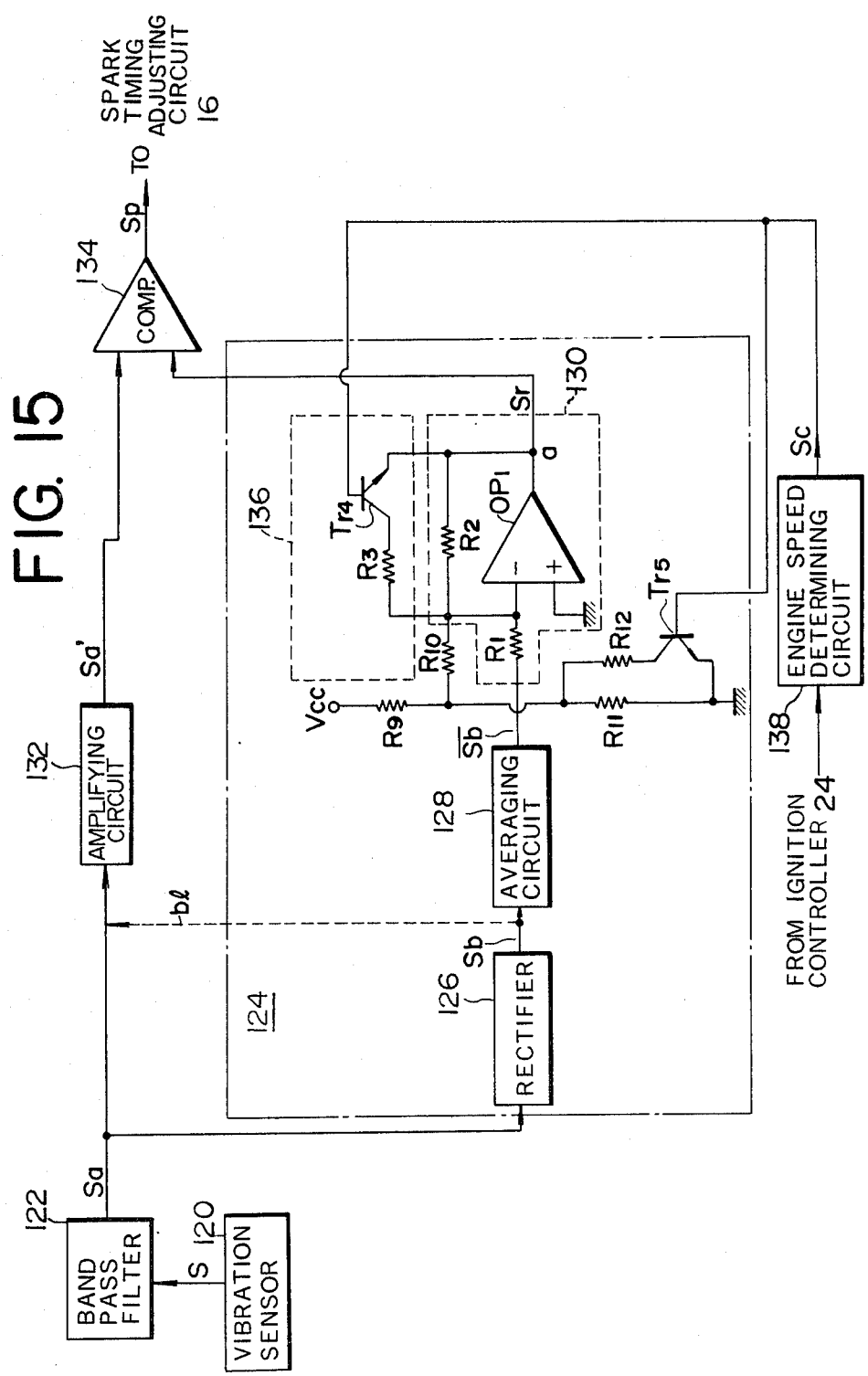

1

KNOCK DETECTOR

BACKGROUND OF THE INVENTION

The present invention relates to the field of knocking detection in a spark ignition internal combustion engine. More particularly, the present invention concerns a knock detector in which a vibration signal representing engine vibrations is compared with a signal from a reference level signal forming circuit to detect engine knock, and address the problem in a conventional system that, when knocking occurs, the level of the reference signal tends to be distorted by the presence of knocking components in the vibration signal.

SUMMARY OF THE INVENTION

A comparator compares, either before or after being rectified, a signal obtained from the vibration signal representing the vibrations of a spark ignition internal combustion engine and which has passed through a signal transmitting means with a reference level signal from a reference level signal forming means to produce a knock signal representing the occurrence of knocking when the former signal is greater in magnitude than the latter. The reference level signal forming means includes a rectifier which rectifies the vibration signal to produce a rectified signal, an averaging means which smooths the rectified signal to produce a smoothed signal and a first amplifying means which amplifies the smoothed signal to produce the reference level signal, mentioned above. When the engine speed is above a predetermined value, an engine speed determining means produces a drive signal to which a changeover means responds by changing the output of at least one of the signal transmitting means and the reference level signal forming means from one value to another whereby a possible knock occurring in the overall range of higher and lower engine speeds is reliably detected for use in spark timing control in the spark ignition internal combustion engine.

BRIEF DESCRIPTION OF THE DRAWINGS

Objects, features and advantages of the present invention will be apparent from the description of a preferred embodiment thereof, taken in conjunction with the accompanying drawings in which:

FIG. 15 is a diagram, similar to FIG. 9, of a fourth embodiment of the knock detector.

DETAILED DESCRIPTION OF THE PREFERRED EMBODIMENT

Figure 1:
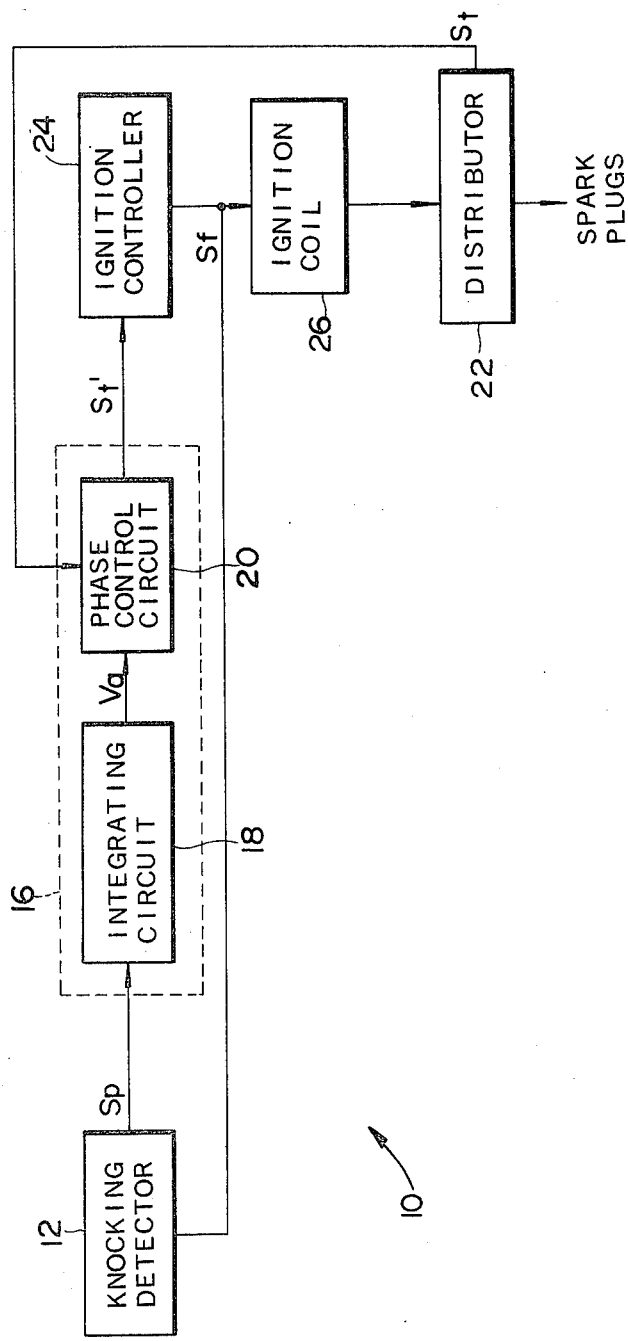
FIG. 1 is a block diagram of a spark timing system for a spark ignition internal combustion engine in which the knock detector according to the present invention is incorporated.
Figure 2:
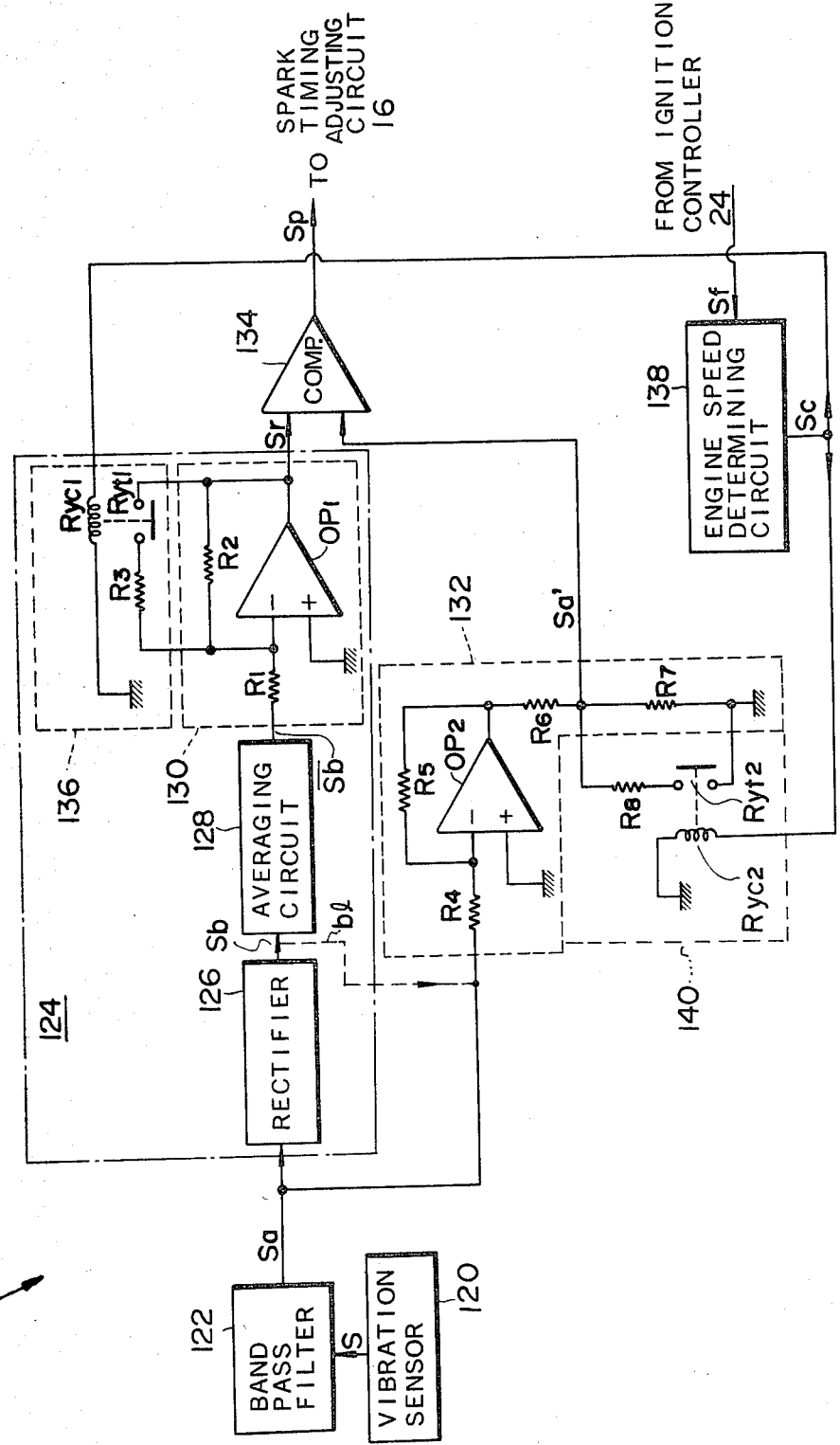
FIG. 2 is a circuit diagram, drawn partially in block form, of the knock detector.

In FIGS. 1 and 2, a spark timing system designated generally by the reference numeral 10 for a spark ignition internal combustion engine and a knock detector according to the present invention incorporated therein are shown. The knock detector, as shown by reference numeral 12, includes a vibration sensor 120 attached, for example, to the cylinder block, cylinder head or intake manifold of the engine, not shown. The sensor may for example be of the magnetostrictive or piezoelectric type. The sensor produces a signal S, shown in FIG. 3, which is supplied to a band pass filter 122 which typically has a central pass frequency $f_0$ of 7 KHz and $Q(=f_0/2f)$ of 10, and therefore passes a signal $S_a$ of a bandwidth substantially equal to 5 to 10 KHz, which is a typical knock signal. More precisely the frequency range of the knock signal will depend mainly on the configuration and temperature of each of the engine combustion chambers. A reference level signal forming circuit 124, constituted by a rectifier 126, an averaging circuit 128 and an amplifying circuit 130, produces a background noise or reference level signal $S_r$ on the basis of the signal $S_a$ from the band pass filter 122.

Figure 3:
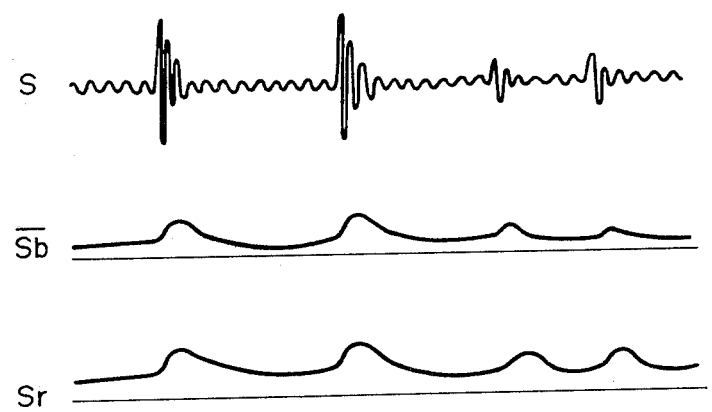
FIG. 3 is a timing chart of the system which shows the waveforms of the signals from several elements of the knock detector.

More particularly, the signal Sa is rectified by the rectifier 126, for example, of a half wave type, into a rectified signal $\overline{S_b}$, which is supplied to the averaging circuit 128 where it is smoothed. The averaging circuit 128 may include a low pass filter or an integrating circuit having a relatively large discharge time constant, thereby providing a direct current voltage signal $S_b$, as shown in FIG. 3, which is amplified by the amplifying circuit 130 with an appropriate amplification factor into the reference level signal $S_r$, as shown in FIG. 3. The amplifying circuit 130 includes an inverting type operational amplifier $OP_1$, an input resistor $R_1$ connecting the output of the averaging circuit 128 and the inverting terminal of the amplifier $OP_1$, and a feedback resistor $R_2$ connecting the input and output of the amplifier $OP_1$.

At the same time, the signal $S_a$ from the filter 122 is amplified by an amplifying circuit 132, which includes an inverting type operational amplifier $OP_2$, an input resistor $R_4$, a feedback resistor $R_5$, as is the case with the amplifying circuit 130, and series connected output resistors $R_6$ and $R_7$, into a signal $S_{a'}$, which is then compared with the reference level signal $S_r$ by a comparator 134. When the signal $S_{a'}$ is greater in magnitude than the signal $S_r$, the comparator 134 produces a corresponding high level pulse signal $S_p$, representing the presence of knocking for that time duration.

The pulse signal $S_p$ then controls an integrating circuit 18 of a spark timing adjusting circuit 16 such that the circuit 18 performs an integration with respect to time with a first time constant while the knock signal $S_p$ is present and preforms a discharge operation while the knock signal $S_p$ is absent with a second different time constant, so that the signal $S_p$ is transformed into a voltage signal $V_a$ corresponding to the magnitude of the knocking.

Figure 4:
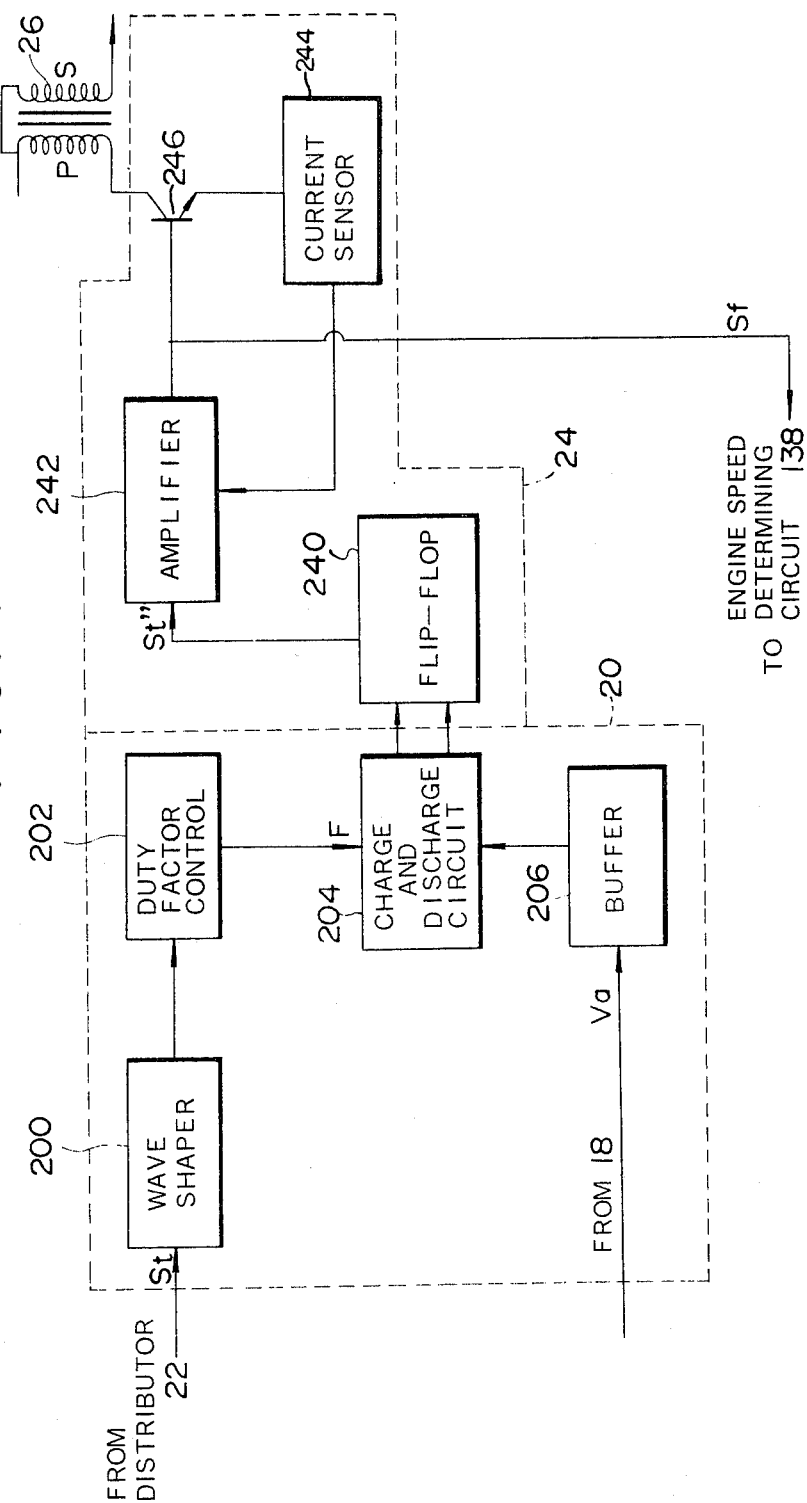
FIG. 4 is a block diagram of the phase control circuit and the ignition controller of FIG. 1.
Figure 5:
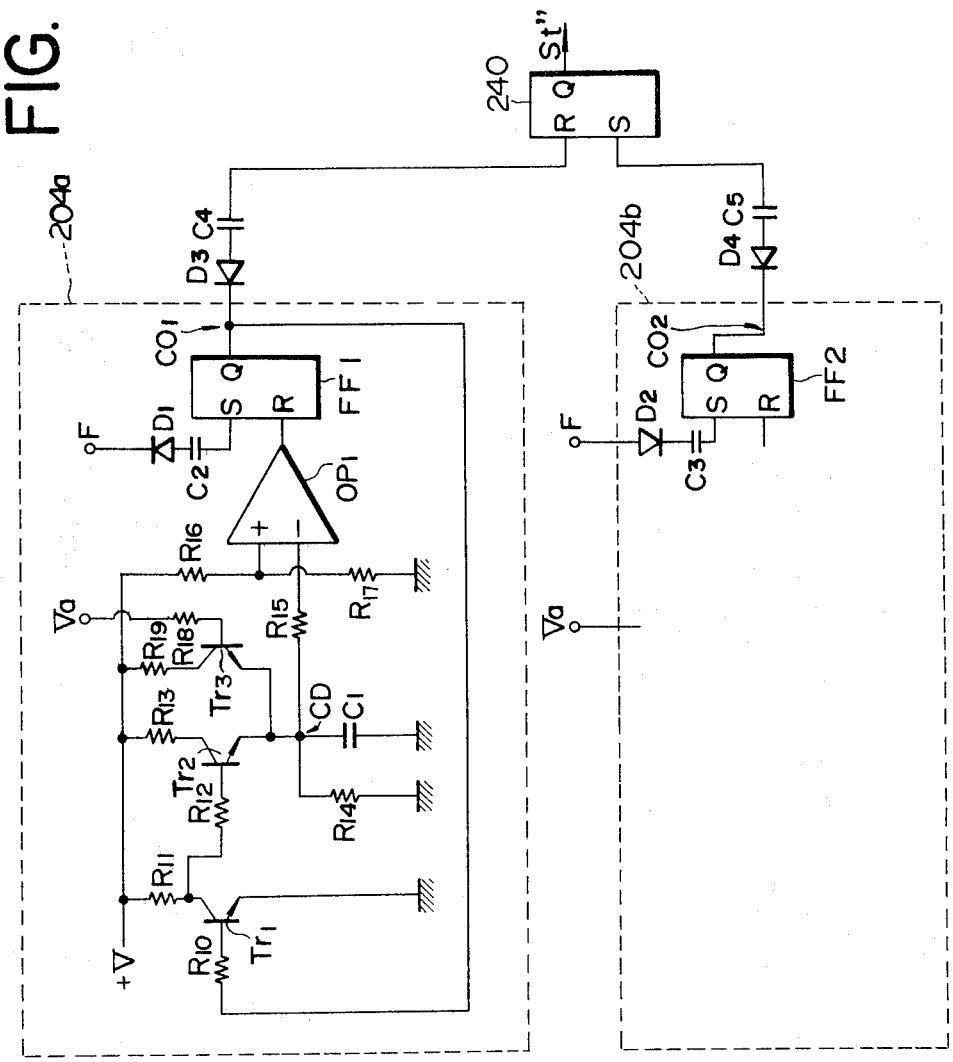
FIG. 5 is a circuit diagram of the charge and discharge circuit of the phase control circuit.
Figure 6:
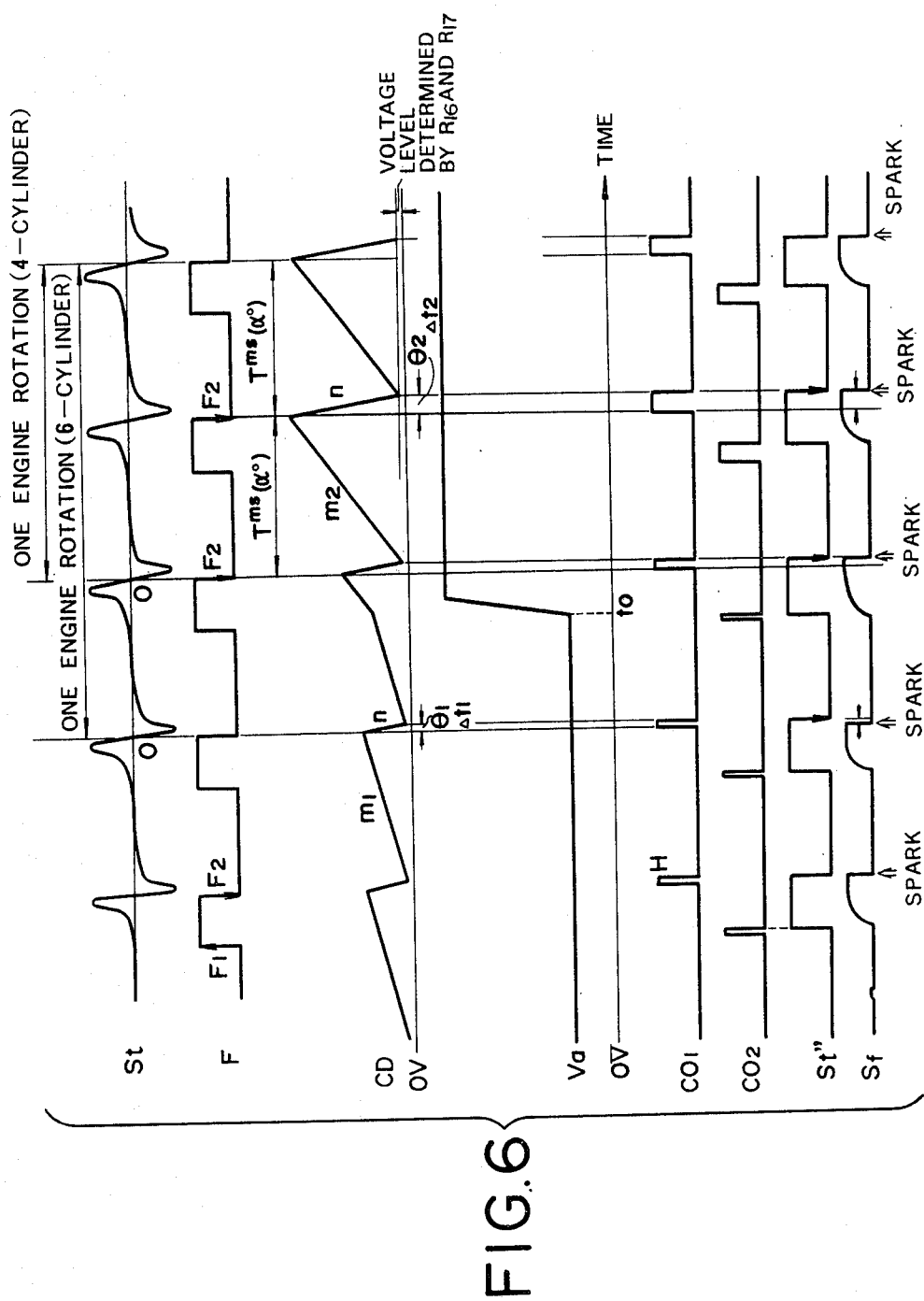
FIG. 6 is a timing chart of the system of FIG. 4.

A phase control circuit 20 of the spark timing adjusting circuit 16 responds to the signal $V_a$, and retards accordingly a reference spark timing signal or crankshaft angle reference signal $S_t$ that a distributor 22 has calculated according to the operational state of the engine, to output an adjusted signal $S_{t'}$ to an ignition controller 24. This controller calculates, based on the signal $S_{t'}$, a dwell angle pulse signal $S_f$ to control the supply of an electric current to an ignition coil 26 so that sparking is effected at a spark plug of each cylinder, not shown, through the distributor 22 by the timing of the trailing edge of each pulse of the dwell angle pulse signal $S_f$ to suppress or avoid the occurrence of further knocking. Details of the structure and operation of the phase control circuit 20 and the ignition controller 24 are shown in FIGS. 4, 5 and 6. The crankshaft angle reference signal $S_t$, which is a basic signal determined from governor and vacuum advance angles, is produced every 180° rotation of the crankshaft in the case of a 4-cylinder engine or once every 120° rotation of the crankshaft in the case of a 6-cylinder engine. The angle reference signal $S_t$ from the distributor 22 is shaped by a wave shaper 200 (FIG. 4) into a signal having regular rectangular pulses which are converted, by a duty factor control circuit 202, to a pulse signal F, as shown in FIG. 6, depending on the rotational speed of the crankshaft and the voltage of the power source. The pulses of the signal F have a constant width and their negative-going edges $F_2$ occur at the downward zero crossing points 0 of the signal $S_t$. The output signal F of the duty factor control circuit 202 is applied to a pair of sub-circuits 204a and 204b constituting a charge and discharge circuit 204. More particularly, in sub-circuit 204a, the output F of the duty factor control circuit 202 forms the input to a series circuit of a diode $D_1$ and a capacitor $C_2$ to the set input of a flip-flop $FF_1$ of the sub-circuit 204a. The flip-flop $FF_1$ is set by the negative-going edge $F_2$ of the signal F and reset by the signal from a comparator $OP_1$ to produce a signal shown by $CO_1$ in FIG. 6. When the signal $CO_1$ is low, a transistor $Tr_1$ is turned off through a resistor $R_{10}$ and a transistor $Tr_2$ is turned on through resistors $R_{11}$ and $R_{12}$ by the power supply $+V$. Thus a capacitor $C_1$ is charged through a resistor $R_{13}$ and the transistor $Tr_2$ and the charging voltage charged across the capacitor $C_1$ is shown by a gradient $m_1$ in FIG. 6. When the Q output of the flip-flop $FF_1$ is high, the transistor $Tr_1$ is turned on and the transistor $Tr_2$ is turned off. Thus, the capacitor $C_1$ is no longer charging and begins to discharge through a resistor $R_{14}$, with the discharging curve being shown by the gradient n in FIG. 6. The output of the comparator $OP_1$ goes high and resets the flip-flop $FF_1$ when the potential across the capacitor $C_1$, as shown by the waveform CD in FIG. 6, applied through a resistor $R_{15}$ to the inverting input of the comparator $OP_1$, falls below the voltage level of the input of the comparator $OP_1$ determined by resistors $R_{16}$ and $R_{17}$.

Normally, the above operation is repeated, but when knocking occurs, the output voltage $V_a$ of the integrating circuit 18 increases at a time $\tau_0$, for example as shown by $V_a$ in FIG. 6. The wave form of $V_a$ in FIG. 6 is shown in a somewhat simpler form than the actual wave form for the purpose of facilitating description. Thus, a transistor $Tr_3$, in FIG. 5, constituting a buffer 206 of FIG. 4, is turned on through a resistor $R_{18}$. The capacitor $C_1$ is charged to the power supply $+V$ through a resistor $R_{19}$ and transistor $Tr_3$ with an electric current proportional to the output voltage $V_a$ and is also charged through the transistor $Tr_2$ and the resistor $R_{13}$ by the power supply $+V$, with the charging waveform being shown by the gradient $m_2$ in FIG. 6. As the voltage across the capacitor $C_1$ increases, the time required to discharge the capacitor $C_1$ to any desired value increases, as will be seen from comparison of the discharge time durations $\Delta t_1$ and $\Delta t_2$, as shown in FIG. 6. These discharge times correspond to delays from the zero crossing points 0 of the crankshaft angle reference signal $S_t$. The delays vary depending on the charge gradients $m_1$ and $m_2$, and the difference between the discharge times $\Delta t_1$ and $\Delta t_2$ represents the difference between the corresponding spark timings.

In more detail, the charge gradient $m_i$ of the wave form CD in FIG. 6 when the output $V_a$ of the integrating circuit 18 is greater than zero is controlled by the output $V_a$ of the integrating circuit 18, while the discharge gradient n is constant.

Here, $$m_i(T-\Delta t_i) = n \times \Delta t_i \qquad (1)$$

where $m_i$ is $m_1$ when $V_a$ is zero, and $m_2$ when $V_a$ is positive, T is the period of the signal F, and $\Delta t_i$ is the discharge time corresponding to the discharge gradient n, and is $\Delta t_1$ when $V_a$ is zero, and $\Delta t_2$ when $V_a$ is positive. Transforming the expression (1), $$\frac{\Delta t_i}{T} = \frac{m_i}{m_i + n} \qquad (2)$$

Since the delay angle $\theta_i = \Delta t_i/T \times \alpha \qquad (3)$ where $\alpha$ is 120 degrees in the case of a 6-cylinder engine and 180 degrees in the case of a 4-cylinder engine, substituting the expression (2) into (3):

$$\theta_i = \frac{m_i}{m_i + n} \times \alpha \qquad (4)$$

The expression (4) shows that the delay angle $\theta_i$ is a function of the charging gradient $m_i$.

Similarly, the second sub-circuit 204b has the same structure and function as sub-circuit 204a except that diode $D_2$ of sub-circuit 204b is connected in the opposite polarity to that of diode $D_1$ of the sub-circuit 204a through a capacitor $C_3$ to the set input S of a flip-flop $FF_2$ of the sub-circuit 204b such that the flip-flop $FF_2$ is set by the positive-going edge $F_1$, as shown in FIG. 6, of the signal F from the duty factor control circuit 202. Thus, the trailing edges of the output pulses $CO_1$ and $CO_2$ of the circuits 204a and 204b are inputted through diode and capacitor pairs $D_3$, $C_4$ and $D_4$, $C_5$ to the reset input R and set input S respectively of flip-flop 240 of the ignition controller 24 to produce a dwell angle signal, shown by $S_{t''}$ in FIG. 6, delayed by a phase angle $\theta_2$ from the duty factor control circuit output F. This signal $S_{t''}$ is supplied through an amplifier 242 and a power transistor 246 of the ignition controller 24 (FIG. 4) to the ignition coil 26. A current sensor 244 senses the current, as shown by $S_f$ in FIG. 6, flowing through the power transistor 246 to control the amplification factor of the amplifier 242 and thus control the current flowing through the power transistor 246. The current $S_f$ flowing through the power transistor 246 and the ignition coil 26 produces a spark at the spark plug, not shown, of the corresponding engine cylinder, also not shown, through the distributor 22 at the trailing edge of each of the current $S_f$ pulses.

Figure 7:
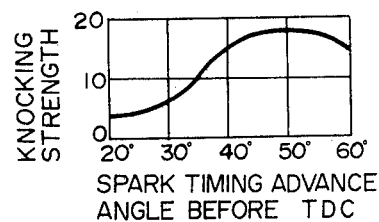
FIG. 7 is a graph showing the relation between spark timing advance angle and knocking strength.
Figure 8:
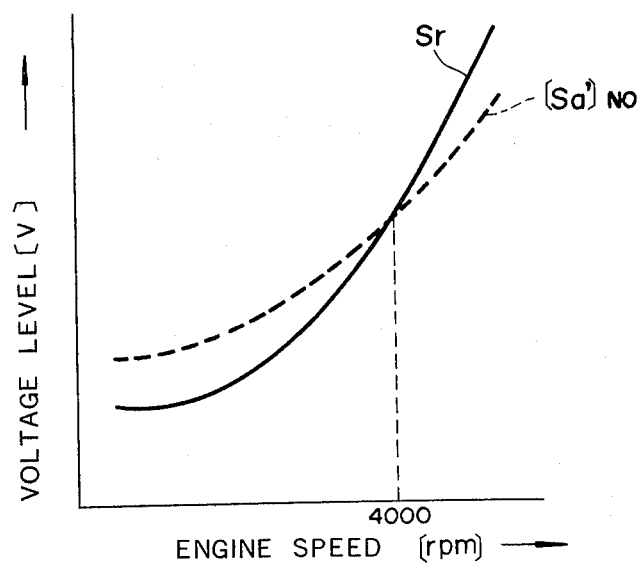
FIG. 8 is a graph showing the relation between engine speed and the inputs to the comparator of the knock detector when the changeover circuits for the amplification factors of the amplifying circuits are not actuated.

The spark timing and the knocking strength are related as shown in FIG. 7, in such a way that as the spark timing is retarded, the occurrence of further knocking is suppressed or avoided.

If the knock detector has only the structure described above, the background noise of reference level signal $S_r$ is greater in magnitude than the maximum $(S_{a'})_{no}$ of the signal $S_{a'}$ from the amplifying circuit 132 when knocking occurs and when the engine is in the high speed range above about 4,000 rpm, so that the relationship $S_{a'} > S_r$ which is the condition that knocking is occurring is reversed, and thus knocking cannot be detected in the range of high engine speeds. The reversal of the condition $(S_{a'})_{no} < S_r$ occurs because as the engine speed increases, the mechanical noise of the engine increases so that the averaging circuit 128 having a relatively large discharge time constant produces an accumulatively increasing output $\overline{S_b}$ which is amplified by the amplifying circuit 130 with an adequate amplification factor. The following description is directed to a system which eliminates the problem of this reversal.

Figure 9:
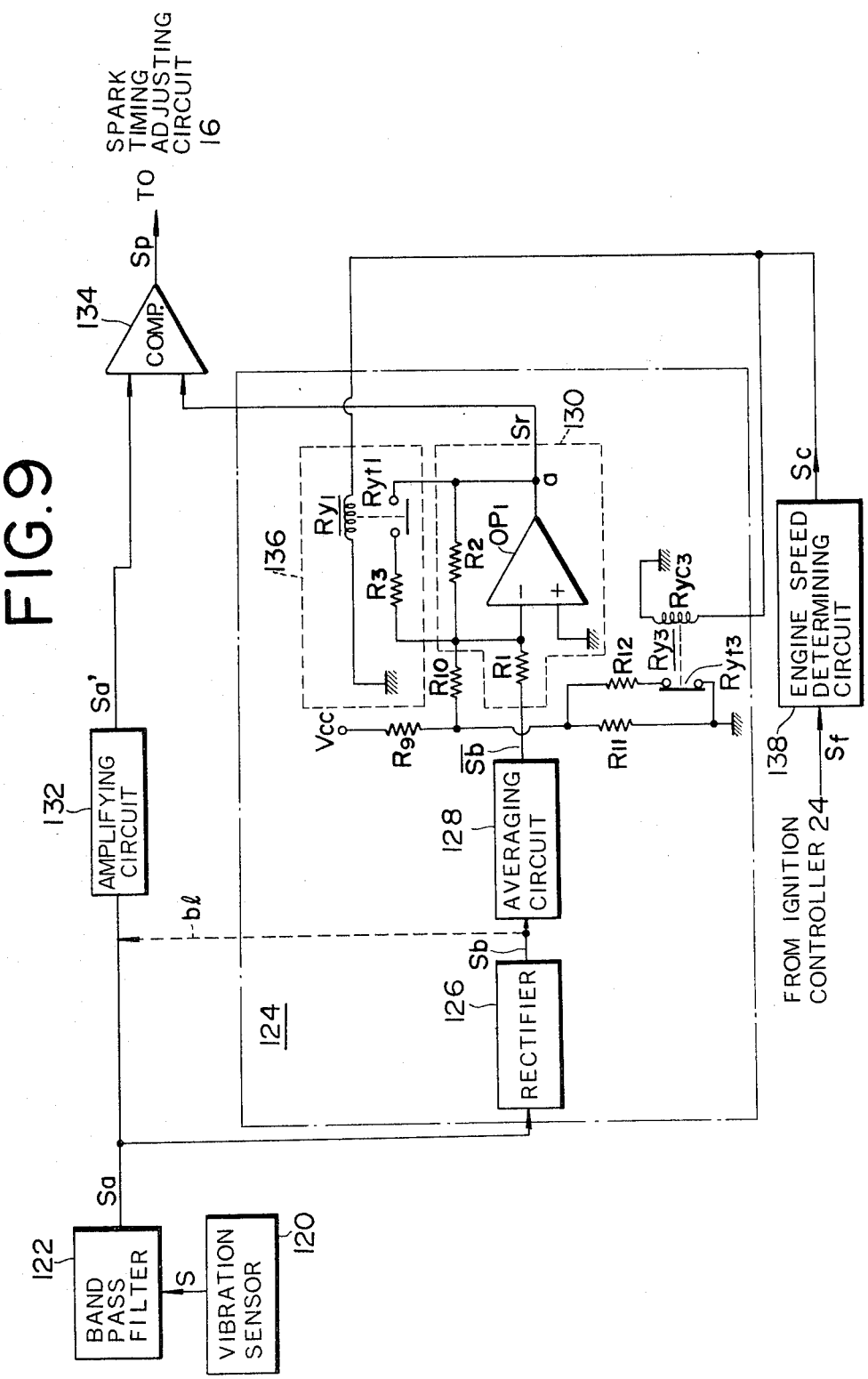
FIG. 9 is a circuit diagram, drawn partially in block form, of a second embodiment of the knock detector.
Figure 10:
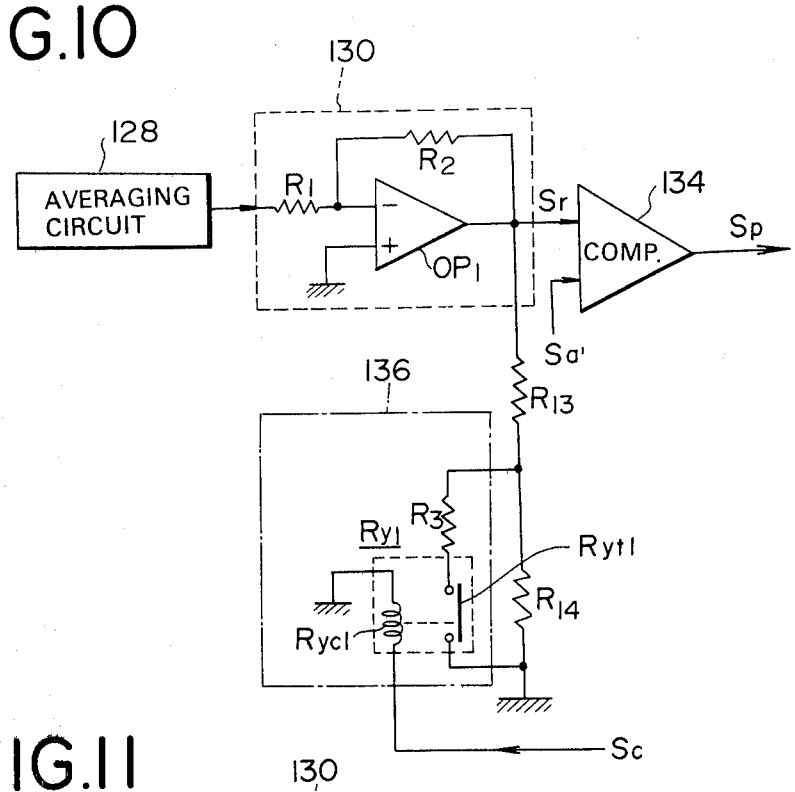
FIGS. 10 to 13 show different modifications of a particular part of the knock detector.
Figure 11:
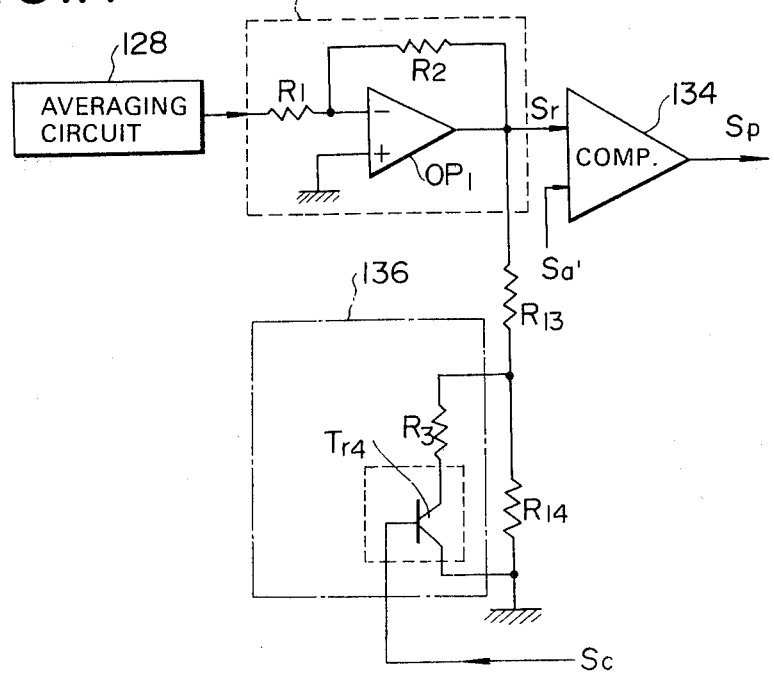
Figure 12:
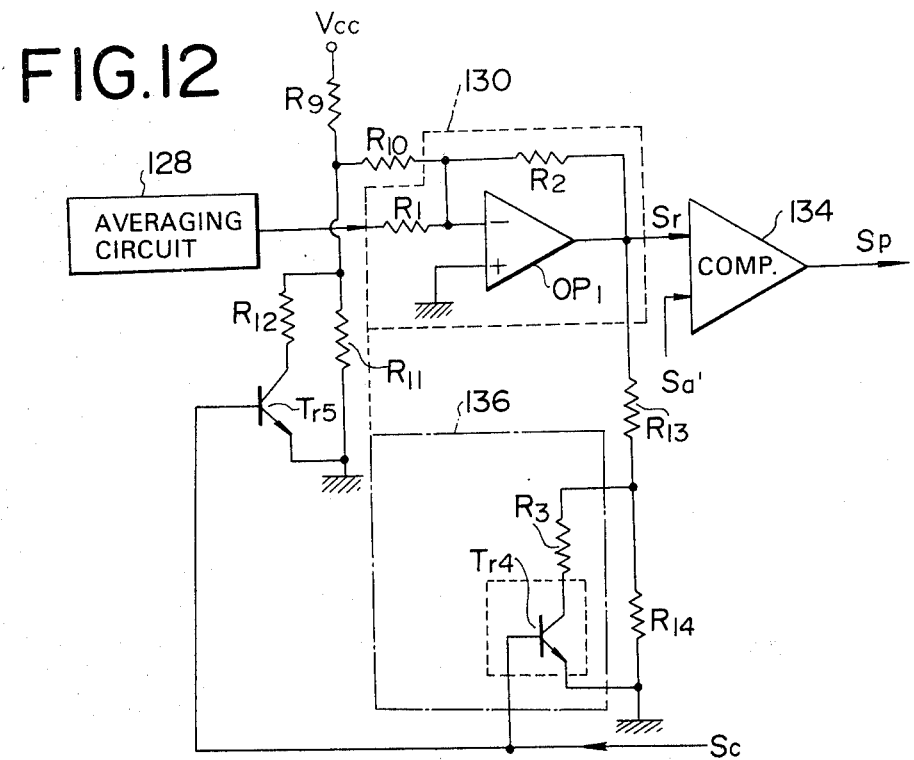
Figure 13:
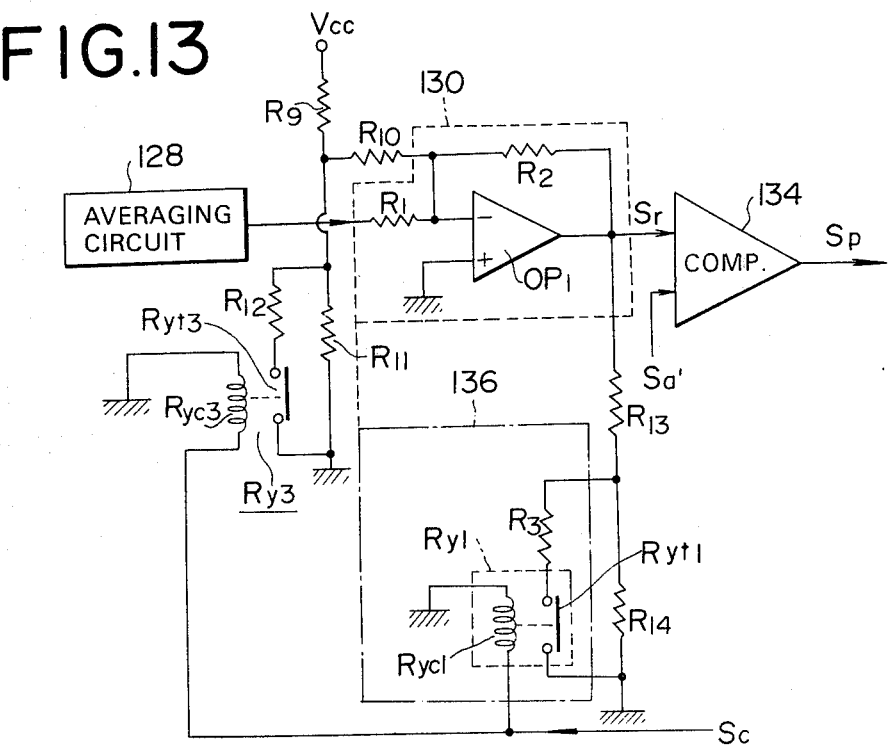
Figure 14:
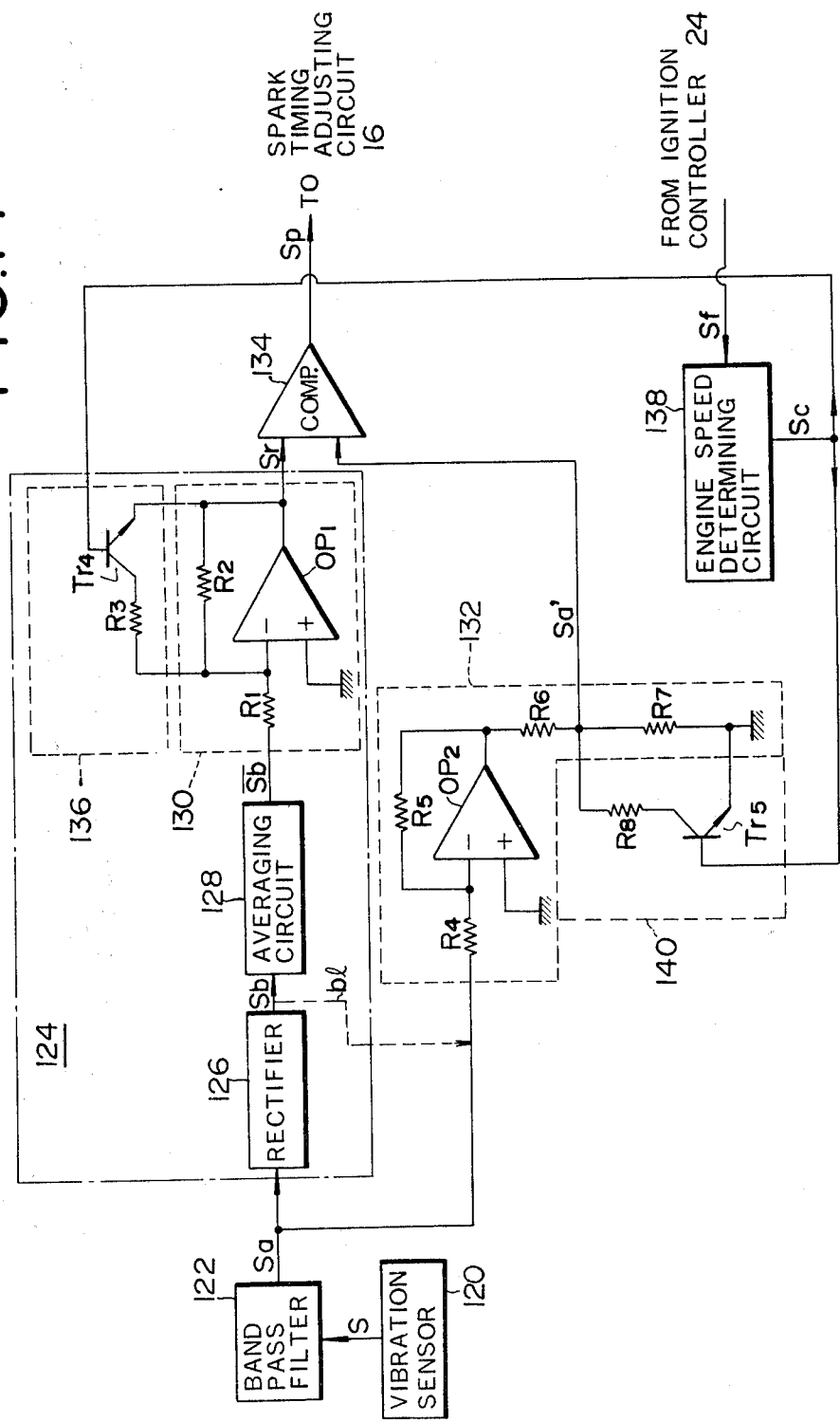
FIG. 14 is a diagram, similar to FIG. 9, of a third embodiment of the knock detector.

A changeover circuit 136, shown in FIG. 9, is provided which includes a second feedback resistor $R_3$ and a relay $Ry_1$ which connects the second feedback resistor $R_3$ in parallel with the first feedback resistor $R_2$ by the closing of relay contacts $Ryt_1$ when the relay coil $Ryc_1$ is energized by a high output $S_c$ of an engine speed determining circuit 138 to change the resistance of the feedback resistor from $R_2$ to $R_2R_3/(R_2+R_3)$ and thus decrease the amplification factor (represented by the feedback resistance/the input resistance) of the amplifying circuit 130 from $R_2/R_1$ to $R_2R_3/R_1(R_2+R_3)$.

The engine speed determining circuit 138 receives the spark ignition signal $S_f$ from the ignition controller 24 to calcuate the engine speed electrically and produce the high output signal $S_c$ only when the engine speed is above a predetermined value such as, for example, 4,000 rpm. Thus, the amplification factor of the amplifying circuit 130 is $R_2/R_1$ when the engine speed is below 4,000, for example, whereas it is $R_2R_3/R_1(R_2+R_3)$ when the engine speed is above 4,000 rpm, thereby reducing the amplification factor, as mentioned above. This prevents the background noise or reference level signal $S_r$ from increasing excessively, due to the mechanical noise of the engine when the engine speed is above 4,000 rpm, so that the signal $S_r$ is prevented from being greater in magnitude than the signal $(S_{a'})_{no}$, thereby allowing detection of knocking even when the engine speed is above 4,000 rpm.

A decrease in the amplification factor of only the amplifying circuit 130 may, however, make impossible correct sensing of the magnitude of knocking in the whole range of engine speeds. In other words, unless the ratio in magnitude of the signals from the amplifying circuits 130 and 132 is substantially constant when the magnitude of knocking is constant, the magnitude of the knocking sensed will involve an error. In order to prevent this, in the particular embodiment, the level of the signal $S_{a'}$ from the amplifying circuit 132 is adapted to decrease with an appropriate ratio to decrease the sensing error when the engine speed is above 4,000 rpm. More particularly, a second changeover circuit 140 includes a relay $Ry_2$ which connects a second output resistor $R_8$ in parallel with the first output resistor $R_7$ by the closing of the normally open relay contacts $Ryt_2$ when its coil $Ryc_2$ is energized by the output $S_c$ of the engine speed determining circuit 138 to decrease the level of the signal to $S_{a'} \cdot (R_6+R_7)(R_7//R_8)/R_7(R_6+R_7//R_8)$ where // denotes $R_7 \cdot R_8/(R_7+R_8)$, thereby making possible the sensing of knocking with substantially the same accuracy in the overall ranges of higher and lower engine speeds.

Thus, use of the pulse signal $S_p$ from the comparator 134 ensures correct spark ignition at each spark plug, not shown, of the engine through the spark timing adjusting circuit 16, the ignition controller 24, the ignition coil 26 and the distributor 22.

In FIG. 9, a second embodiment of the knock detector according to the present invention has the same structure as the knock detector of FIG. 1 except that the ratio of the outputs of the amplifying circuits 130 and 132 is maintained substantially constant in the overall range of higher and lower engine speeds by increasing the offset value of the amplifying circuit 130 instead of decreasing the level of the signal $S_{a'}$ from the amplifying circuit 132 when the magnitude of knocking is assumed to be constant. More particularly, when the engine speed is below 4,000 rpm, a voltage $V_{cc} \cdot R/(R+R_9)$ where $R = R_{11} \cdot R_{12}/(R_{11}+R_{12})$ is applied through resistors $R_{10}$ and $R_2$ to the output point a of the operational amplifier $OP_1$. On the other hand, when the engine speed is above 4,000 rpm, the coil $Ryc_3$ of a relay $Ry_3$ is energized by the output signal $S_c$ from the engine speed determining circuit 138 to open normally closed relay contacts $Ryt_3$ so that a voltage $V_{cc} \cdot R_{11}/(R_{11}+R_9)$ where $R_{11} > R$, higher than the voltage applied when the engine speed is below 4,000 rpm is applied through resistors $R_{10}$ and $R_2$ to the point a. If the difference between the voltages $V_{cc} \cdot R/(R+R_9)$ and $V_{cc} \cdot R_{11}/(R_{11}+R_9)$ is set to equal the decrease in the magnitude of the amplified signal $S_{a'}$ of the amplifying circuit 132 in the first embodiment of FIG. 1, the second embodiment will also have the same effect as the first embodiment.

In these two embodiments, the combination of the amplifying circuits 130 and the changeover circuit 136 may be replaced by arrangements, as shown in FIGS. 10 to 13, in which the resistor $R_3$ is connected in parallel with a resistor $R_{14}$, cooperating with a resistor $R_{13}$ to form an overall output resistor, when a relay $Ry_1$ or a transistor $Tr_4$ is operated by the signal $S_c$. The amplifying circuit 130 may be replaced by a direct current amplifier including transistors instead of using an operational amplifier. The amplification factor of the amplifying circuit 130 has been described and shown as being switched in two stages, but it may be switched in more stages according to the engine speed to increase the accuracy with which the knocking is sensed. In the above embodiments, switching elements such as transistors $Tr_4$ and $Tr_5$ may be used, as shown in FIGS. 11, 12, 14 and 15, instead of the relays $Ry_1$ and $Ry_2$. Furthermore, in the above embodiments, the input signal to the amplifying circuit 132 has been described and shown as being obtained as $S_a$ from the band pass filter 122 but instead, it may be obtained as the signal $S_b$ from the rectifier 126, as shown by a broken line bl in FIGS. 2, 9, 14 and 15.

A knock control system incorporating a knock detector according to the present invention produces correct spark timing in the total range of engine speeds, thereby suppressing or avoiding knocking reliably.

While the present invention has been described and shown in terms of several embodiments thereof, various changes and modifications could be made by those in the art without departing from the spirit and the scope of the present invention.

What is claimed is:

1. A knock detector for a spark ignition internal combustion engine, comprising:
   a. a vibration sensor for sensing engine vibrations to produce a vibration signal corresponding to the vibrations;
   b. means for transmitting therethrough a signal obtained from the vibration signal;
   c. a reference level signal forming means including:
      1. a rectifier for rectifying the vibration signal to produce a rectified signal;
      2. an averaging means for smoothing the rectified signal to produce a smoothed signal; and
      3. a first amplifying means for amplifying the smoothed signal to produce a reference level signal;
   d. a comparator for comparing the signal from said transmitting means with the reference level signal to produce a knock signal representing the occurrence of knock when the former signal is greater in magnitude than the latter;
   e. an engine speed determining means for sensing the engine speed to produce a drive signal when the engine speed exceeds a predetermined value; and
   f. a changeover means responsive to the drive signal for changing the magnitude of the output of at least one of said transmitting means and the reference signal forming means such that the relationship in magnitude between the reference signal and the signal from the transmitting means before the drive signal is produced is maintained.

2. The knock detector as claimed in claim 1, wherein said first amplifying means includes an operational amplifier, an input resistor connecting the output of said averaging means to the inverting input of said operational amplifier, a first feedback resistor connecting the inverting input and output of said operational amplifier, and said changeover means includes a first change means responsive to the drive signal for reducing the resistance of said first feedback resistor.

3. The knock detector as claimed in claim 2, wherein said first change means includes a second feedback resistor and a first switching means responsive to the drive signal for connecting said second feedback resistor in parallel with said first feedback resistor.

4. The knock detector as claimed in claim 1, 2 or 3, wherein said transmitting means includes a second amplifying means for amplifying the signal obtained from the vibration signal, said second amplifying means having a first output resistor connecting the output of said second amplifying means to ground, and said changeover means includes a second change means responsive to the drive signal for reducing the resistance of said first output resistor.

5. The knock detector as claimed in claim 4, wherein the signal obtained from the vibration signal is a substantially unaltered signal.

6. The knock detector as claimed in claim 4, wherein the signal obtained from the vibration signal is a rectified signal.

7. The knock detector as claimed in claim 4, wherein said second change means includes a second output resistor and a second switching means responsive to the drive signal for connecting said second output resistor in parallel with said first output resistor.

8. The knock detector as claimed in claim 7, wherein the signal obtained from the vibration signal is a substantially unaltered signal.

9. The knock detector as claimed in claim 7, wherein the signal obtained from the vibration signal is a rectified signal.

10. The knock detector as claimed in claim 1, wherein said changeover means includes a first output resistor connecting the output of said first amplifying means to ground and a third change means responsive to the drive signal for reducing the resistance of said first output resistor.

11. The knock detector as claimed in claim 2 or 3 wherein said changeover means includes an offset change means responsive to the drive signal for reducing an offset output of said first amplifying means.

12. The knock detector as claimed in claim 11, wherein the signal obtained from the vibration signal is a substantially unaltered signal.

13. The knock detector as claimed in claim 11, wherein the signal obtained from the vibration signal is a rectified signal.

14. The knock detector as claimed in claim 11, wherein said offset change means includes an offset voltage applied to the inverting input of said operational amplifier and a means responsive to the drive signal for reducing the magnitude of the offset voltage.

15. The knock detector as claimed in claim 14, wherein the signal obtained from the vibration signal is a substantially unaltered signal.

16. The knock detector as claimed in claim 14, wherein the signal obtained from the vibration signal is a rectified signal.

17. The knock detector as claimed in claim 14, wherein said offset change means includes series connected first and second offset resistors connecting the offset voltage to ground, a third offset resistor connecting the common junction between said first and second offset resistors to the inverting input of said operational amplifier, a fourth offset resistor, and a third switching means responsive to the drive signal for connecting said fourth resistor in parallel with said second offset resistor.

18. The knock detector as claimed in claim 17, wherein the signal obtained from the vibration signal is a substantially unaltered signal.

19. The knock detector as claimed in claim 17, wherein the signal obtained from the vibration signal is a rectified signal.

20. The knock detector as claimed in claim 10, wherein said third change means includes a second output resistor and a third switching means responsive to the drive signal for connecting said second output resistor in parallel with said first output resistor.

21. The knock detector as claimed in any one of claims 1, 2, 3, 10 and 20, wherein the signal obtained from the vibration signal is a substantially unaltered signal.

22. The knock detector as claimed in any one of claims 1, 2, 3, 10 and 20, wherein the signal obtained from the vibration signal is a rectified signal.

* * * * *